UNITED STATES PATENT OFFICE.

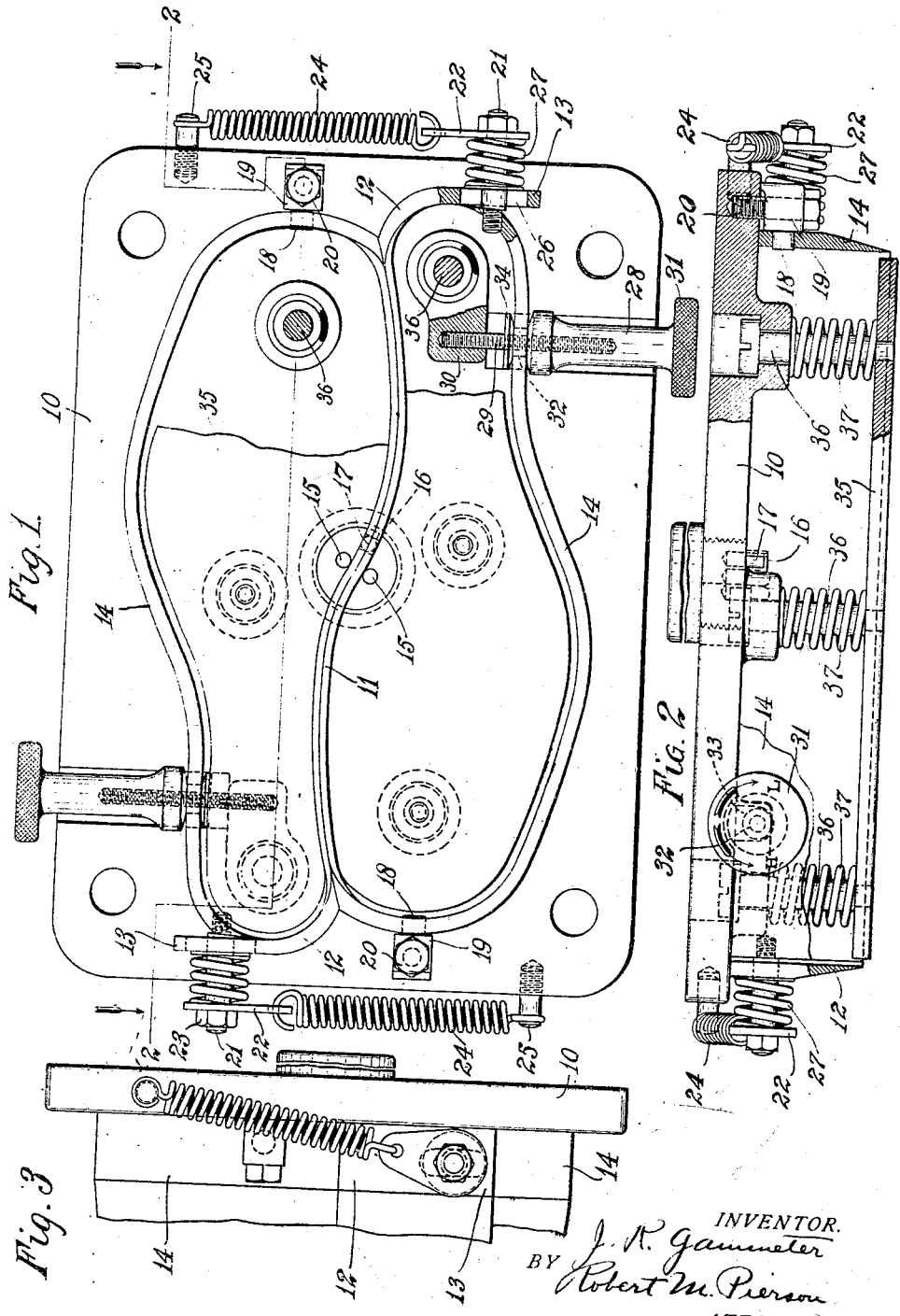

JOHN R. GAMMETER, OF AKRON, OHIO, ASSIGNOR TO THE B. F. GOODRICH COMPANY, OF NEW YORK, N. Y., A CORPORATION OF NEW YORK.

ADJUSTABLE CUTTING-DIE.

1,283,724.  Specification of Letters Patent.  Patented Nov. 5, 1918.

Application filed July 26, 1917. Serial No. 182,893.

*To all whom it may concern:*

Be it known that I, JOHN R. GAMMETER, a citizen of the United States, residing at Akron, in the county of Summit and State of Ohio, have invented certain new and useful Improvements in Adjustable Cutting-Dies, of which the following is a specification.

This invention relates to dies for cutting molding blanks for boot and shoe soles out of raw rubber-and-fiber compound or similar material, and its primary object is to enable soles of different sizes, and especially of different widths, to be cut with the same die. A secondary object is to embody the adjustable feature in a double or multiple die so as to increase the number of soles which can be cut at a single operation, and economize in the use of material.

Of the accompanying drawings,

Figure 1 is a reverse plan view of a two-sole adjustable-die structure made according to my invention.

Fig. 2 is a side elevation, partly in section on the line 2—2 of Fig. 1.

Fig. 3 is an end elevation of the structure standing up on edge.

10 is a supporting plate, on the under side of which the die is mounted, and against which the movable platen of a press is adapted to descend in order to force the die through a slab of the rubber-and-fiber composition or other material supported upon the fixed platen or cutting block of the press. The die consists of blades with sharpened lower edges conforming to the outline of two shoe-soles laid side-by-side with their toes pointing in opposite directions, so that the forepart of one conforms to the shank and heel part of the other, there being a fixed blade 11 common to the inner edge of each of the soles, a short fixed blade 12 at each end thereof forming practically half of the rounded rear edge of the heel and provided with an ear or extension 13, and two adjustable blades 14 forming the remainder of the rear edges of the heels and the entire outer and front toe edge portions of each sole. The middle blade 11 is straddled by a pair of fixed cylindrical pins 15 on the top plate 10, and is formed with a notch 16 occupied by a third cylindrical pin 17, whereby the middle of said blade 11 is held against longitudinal and lateral movement, but any slight bending movement which may take place in the adjustment of the die is permitted. The die is suspended from the top plate 10 by a pair of horizontal cylindrical pins 18 attached to posts 19 which are secured by bolts 20 to the plate 10, said pins occupying holes in the adjustable blades 14 at the toe of each sole.

The cutting edge of each adjustable blade 14 at its free end overlaps on that of the blade 12, so as to make substantially a continuous cutting edge at the rear of the heel portion, and in said free end is screwed the stem of a post 21 having a plate 22 secured thereto by a nut 23 and connected by a pull spring 24 with a fixed post 25 upon the edge of the plate 10, whereby each adjustable blade is yieldingly drawn toward the middle or fixed blade 11, thus tending to narrow the width of each half of the die, the narrowing being greatest at the heel and shank portions. Each post 21 occupies a slot 26 in the corresponding blade extension 13, and is surrounded by a heavy spring 27 interposed between said extension and the plate 22 for the purpose of springing the overlapping blade sections together and avoiding any appreciable gap. To increase the width of the die, each blade 14 is provided near its free end with a nut 28 mounted upon a screw 29 whose inner end is fixed in a boss 30, said nut having a knurled head 31 at its outer end and a reduced neck 32 near its inner end occupying a notch or recess 33 in the upper edge of blade 14, there being a terminal flange 34 beyond this neck abutting against the inner face of the blade. On screwing either nut 28 outwardly, its flange 34 draws the free end of the corresponding adjustable blade 14 outwardly against the tension of spring 24, thereby widening the die.

Within each half of the die there is located an ejector plate 35 suspended by guide pins 36 from the top plate 10 and yieldingly depressed by springs 37 surrounding said pins.

It is evident that the use of this adjustable die avoids the necessity for providing a different die for each width of sole blank of a given length. Furthermore, although the adjustable feature could be embodied in a single die, the use of the double die increases production by permitting two soles to be cut at each operation of said die, and this feature incidentally economizes in the use of material because the two halves possess a common cutting edge in their middle blade, avoiding the necessity for skill on the part of the operator, such as would be required of him in conforming the inner outlines of two adjacent soles cut successively with a single die.

The above-described details of construction may be variously modified without departing from the scope of my invention.

I claim:

1. A sole-shaped die composed of blade members relatively adjustable to vary the space inclosed by the die, yielding means for moving said blade members together, and a positive adjusting device for separating said members.

2. A die comprising blade members defining the outline of a sole and overlapping at the heel to provide a substantially continuous cutting edge at different adjustments, a spring for contracting the width of the die, and a screw device for expanding the die.

3. A die comprising a top plate, blades defining the outline of a sole and terminating at the heel in a blade member fixed to the top plate and a laterally-adjustable blade member overlapping said fixed member on the inside, a post on said adjustable member projecting outwardly past the fixed member, a spring attached to said post and top plate for contracting the die, and a screw device mounted on the top plate and operating on said adjustable member for expanding the die.

4. A die comprising overlapping relatively-adjustable blade members forming a substantially continuous sole-shaped cutting edge at different adjustments and slidable on each other longitudinally of said cutting edge, and means acting transversely of the overlapped blade portions for yieldingly holding the same in contact.

5. A die comprising a top plate, blades defining the outline of a sole and overlapped at the heel end, one blade being fixed to the top plate at said end and the other adjustable to vary the width of the die, a spring and a screw device acting in opposite directions on said adjustable blade, respectively for contracting and expanding the width of the die, and means for yieldingly pressing the blade terminals together transversely at the heel end.

6. A die comprising a top plate, blades defining the outline of a sole and overlapped at the heel end, the external blade terminal being fixed to said top plate and the internal blade adjustable, a post on the internal blade terminal extending outwardly past the fixed terminal and surrounded by a spring which presses the terminals together in a transverse direction, means for yieldingly actuating the adjustable blade in one direction to vary the width of the die, and adjusting means for positively actuating it in the opposite direction.

7. A double die comprising blades defining the outlines of two soles pointing in opposite directions, there being a middle blade common to both soles, and overlapping blade terminals at the corresponding ends of the respective soles.

8. A double die defining the outline of two soles pointing in opposite directions and having a common middle blade, and an outer blade on each side adjustable to vary the width of the corresponding die section.

9. A double die for cutting two sole blanks at the same time, the respective sections defining soles which point in opposite directions, and having a common middle blade, a short fixed branch blade at each end defining substantially half of the heel portion of the corresponding die section, an outer blade on each side whose terminal defines the other half of the heel portion and overlaps on the inner side of said fixed branch blade, and means engaging the heel portion of each adjustable blade for moving the same laterally to vary the width of the corresponding die section.

10. A double sole die comprising a top plate, blades defining the outlines of two soles pointing in opposite directions and including a middle blade common to the two die sections, a branch heel blade at each end and an outer adjustable blade on each side overlapping said heel blade, means on said top plate confining the middle blade against lateral and longitudinal movement, means on said top plate engaging the toe ends of the outer blades of the respective sections for suspending the die on said top plate, and adjusting means on said top plate engaging the respective adjustable blades near the heel ends thereof for varying the widths of the two die sections.

In testimony whereof I have hereunto set my hand this twenty fourth day of July 1917.

JOHN R. GAMMETER.